United States Patent
Chen et al.

(10) Patent No.: US 10,057,893 B2
(45) Date of Patent: Aug. 21, 2018

(54) INTERACTION OF SOUNDING REFERENCE SIGNALS WITH UPLINK CHANNELS FOR COORDINATED MULTI-POINT OPERATIONS

(71) Applicant: QUALCOMM Incorporated, San Diego, CA (US)

(72) Inventors: Wanshi Chen, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 13/889,946

(22) Filed: May 8, 2013

(65) Prior Publication Data

US 2013/0301564 A1 Nov. 14, 2013

Related U.S. Application Data

(60) Provisional application No. 61/645,385, filed on May 10, 2012.

(51) Int. Cl.
*H04W 72/04* (2009.01)
*H04W 72/12* (2009.01)
(Continued)

(52) U.S. Cl.
CPC ......... *H04W 72/042* (2013.01); *H04L 1/0026* (2013.01); *H04L 1/06* (2013.01);
(Continued)

(58) Field of Classification Search
CPC ............ H04W 72/042; H04W 72/1289; H04L 5/0035; H04L 5/0053; H04L 5/0091; H04L 1/0026; H04L 1/06; H04L 1/1671
See application file for complete search history.

(56) References Cited

U.S. PATENT DOCUMENTS

| 2010/0296467 A1* | 11/2010 | Pelletier ............ H04W 74/0833 370/329 |
| 2011/0098054 A1* | 4/2011 | Gorokhov et al. ........ 455/452.1 |

(Continued)

FOREIGN PATENT DOCUMENTS

| CN | 101617489 A | 12/2009 |
| WO | WO-2011102768 A1 | 8/2011 |

(Continued)

OTHER PUBLICATIONS

Huawei et al., "Simultaneous transmission of SRS and PUCCH", 3GPP Draft; R1-114086, 3rd Generation Partnership Project (3GPP), Mobile Competence Centre; 658, Route Des Lucioles; F-06921 Sophia-Antipolis Cedex; France, vol. RAN WG1, no. San Francisco, USA; Nov. 14, 2011-Nov. 18, 2011, Nov. 8, 2011 (Nov. 8, 2011), XP050562066, [retrieved on Nov. 8, 2011] section 3.

(Continued)

*Primary Examiner* — Joshua Kading
(74) *Attorney, Agent, or Firm* — Patterson & Sheridan, LLP

(57) ABSTRACT

Certain aspects of the present disclosure provide methods and apparatus for facilitating interaction of sounding reference signals (SRS) with uplink channels, while supporting coordinated multipoint (CoMP) transmission/reception operations. One method generally includes receiving, from one or more nodes participating in the CoMP operations with a user equipment (UE), signaling indicating at least one of cell-specific SRS configurations or formats for uplink channels, and determining based, at least in part upon the signaling, whether at least one last symbol of a subframe is available for transmitting one or more of the uplink channels from the UE.

22 Claims, 11 Drawing Sheets

(51) Int. Cl.
*H04L 5/00* (2006.01)
*H04L 1/00* (2006.01)
*H04L 1/06* (2006.01)
*H04L 1/16* (2006.01)

(52) U.S. Cl.
CPC .......... *H04L 1/1671* (2013.01); *H04L 5/0035* (2013.01); *H04L 5/0091* (2013.01); *H04W 72/1289* (2013.01); *H04L 5/0053* (2013.01)

(56) References Cited

U.S. PATENT DOCUMENTS

| | | | |
|---|---|---|---|
| 2011/0170435 A1* | 7/2011 | Kim | H04L 5/0023 370/252 |
| 2011/0199944 A1* | 8/2011 | Chen et al. | 370/280 |
| 2011/0268028 A1 | 11/2011 | Stern-Berkowitz et al. | |
| 2011/0275335 A1* | 11/2011 | Luo et al. | 455/127.1 |
| 2012/0046032 A1* | 2/2012 | Baldemair et al. | 455/434 |
| 2012/0057516 A1* | 3/2012 | Ahn et al. | 370/312 |
| 2012/0149297 A1 | 6/2012 | Suh et al. | |
| 2012/0250558 A1* | 10/2012 | Chung et al. | 370/252 |
| 2013/0010659 A1 | 1/2013 | Chen et al. | |
| 2013/0016705 A1 | 1/2013 | Zhang et al. | |
| 2013/0195025 A1* | 8/2013 | Chatterjee | H04L 5/1469 370/329 |
| 2014/0198766 A1* | 7/2014 | Siomina | H04W 72/082 370/330 |

FOREIGN PATENT DOCUMENTS

| WO | WO-2012022368 A1 | 2/2012 |
|---|---|---|
| WO | WO-2012023892 A1 | 2/2012 |

OTHER PUBLICATIONS

International Search Report and Written Opinion—PCT/US2013/040243—ISA/EPO—Sep. 27, 2013.
Panasonic: "PUCCH enhancement for UL CoMP", 3GPP Draft; R1-121158, 3rd Generation Partnership Project (3GPP), Mobile Competence Centre; 658, Route Des Lucioles; F-06921 Sophia-Antipolis Cedex; France, vol. RAN WG1, no. Jeju, Korea; Mar. 26, 2012-Mar. 30, 2012, Mar. 20, 2012 (Mar. 20, 2012), XP050599461, [retrieved on Mar. 20, 2012] sections 3.2 and 4.
Potevio: "Proposal for an Enhanced SRS Scheme for CoMP", 3GPP Draft; R1-100616, 3rd Generation Partnership Project (3GPP), Mobile Competence Centre; 650, Route Des Lucioles; F-06921 Sophia-Antipolis Cedex; France, vol. RAN WG1, no. Valencia, Spain; Jan. 10, 2010, Jan. 12, 2010 (Jan. 12, 2010), XP050418221, [retrieved on Jan. 12, 2010] section 2.1.
ZTE: "Remaining Open issues of Simultaneous transmission of UL Channels/Signals", 3GPP Draft; R1-110165 Remaining Open Issues of Simultaneous Transmission of UL Channels, 3rd Generation Partnership Project (3GPP), Mobile Competence Centre; 650, Route Des Lucioles; F-06921 Sophia-Antipolis Cedex; France, vol. RAN WG1, no. Dublin, Ireland; Jan. 17, 2011-Jan. 21, 2011, Jan. 31, 2011 (Jan. 31, 2011), XP050599022, [retrieved on Jan. 31, 2011] section 5.
CATT: "SRS Enhancement for CoMP [online]," 3GPP TSG-RAN WG1#68 R1-120107, URL:http://www.3gpp.org/ftp/tsg_ran/WG1_RL1/TSGR1_68/Docs/R1-120107.zip, Feb. 10, 2012, 2 pages.
PANTECH: "SRS Enhancements for CoMP [online]," 3GPP TSG-RAN WG1#68b R1-121362, URL:http://www.3gpp.org/ftp/tsg_ran/WG1_RL1/TSGR1_68b/Docs/R1-121362.zip, Mar. 30, 2012, 3 pages.

* cited by examiner

INTERACTION OF SOUNDING REFERENCE SIGNALS WITH UPLINK CHANNELS FOR COORDINATED MULTI-POINT OPERATIONS

CROSS-REFERENCE TO RELATED APPLICATIONS

This application claims benefit of U.S. Provisional Patent Application Ser. No. 61/645,385, filed 10 May 2012, which is expressly incorporated by reference herein in its entirety.

BACKGROUND

Field

The present disclosure relates generally to communication systems, and more particularly, to a system and method for performing coordinated multipoint (CoMP) channel state information (CSI) feedback under multiple channel and interference assumptions.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a user equipment (UE). The method generally includes receiving, from one or more nodes participating in coordinated multipoint (CoMP) operations with the UE, signaling indicating at least one of cell-specific sounding reference signal (SRS) configurations or formats for uplink channels; and determining based, at least in part upon the signaling, whether at least one last symbol of a subframe is available for transmitting one or more of the uplink channels from the UE.

Certain aspects of the present disclosure provide an apparatus for wireless communications by a user equipment (UE). The apparatus generally includes means for receiving, from one or more nodes participating in coordinated multipoint (CoMP) operations with the UE, signaling indicating at least one of cell-specific sounding reference signal (SRS) configurations or formats for uplink channels; and means for determining based, at least in part upon the signaling, whether at least one last symbol of a subframe is available for transmitting one or more of the uplink channels from the UE.

Certain aspects of the present disclosure provide an apparatus for wireless communications by a user equipment (UE). The apparatus generally includes at least one processor and a memory coupled to the at least one processor. The at least one processor is generally configured to receive, from one or more nodes participating in coordinated multipoint (CoMP) operations with the UE, signaling indicating at least one of cell-specific sounding reference signal (SRS) configurations or formats for uplink channels; and determine based, at least in part upon the signaling, whether at least one last symbol of a subframe is available for transmitting one or more of the uplink channels from the UE.

Certain aspects of the present disclosure provide a computer-program product for wireless communications by a user equipment (UE). The computer-program product generally includes a computer-readable medium having code for receiving, from one or more nodes participating in coordinated multipoint (CoMP) operations with the UE, signaling indicating at least one of cell-specific sounding reference signal (SRS) configurations or formats for uplink channels; and determining based, at least in part upon the signaling, whether at least one last symbol of a subframe is available for transmitting one or more of the uplink channels from the UE.

Certain aspects of the present disclosure provide a method for wireless communications by a node participating with other nodes in CoMP operations with a UE. The method generally includes transmitting, to the UE, signaling indicating at least one of cell-specific SRS configurations or formats for uplink channels; and based at least upon the signaling, participating in the CoMP operations with the UE.

Certain aspects of the present disclosure provide an apparatus for wireless communications by a node participating with other nodes in CoMP operations with a UE. The apparatus generally includes means for transmitting, to the UE, signaling indicating at least one of cell-specific sounding reference signal (SRS) configurations or formats for uplink channels; and based at least upon the signaling, means for participating in the CoMP operations with the UE.

Certain aspects of the present disclosure provide an apparatus for wireless communications by a node participating with other nodes in CoMP operations with a UE. The apparatus generally includes at least one processor and a memory coupled to the at least one processor. The at least one processor is generally configured to transmit, to the UE, signaling indicating at least one of cell-specific sounding reference signal (SRS) configurations or formats for uplink channels; and based at least upon the signaling, participate in the CoMP operations with the UE.

Certain aspects of the present disclosure provide a computer-program product for wireless communications by a node participating with other nodes in CoMP operations with a UE. The computer-program product generally includes a computer-readable medium having code for transmitting, to the UE, signaling indicating at least one of cell-specific sounding reference signal (SRS) configurations or formats for uplink channels; and based at least upon the signaling, participating in the CoMP operations with the UE.

DETAILED DESCRIPTION

Figure 1:
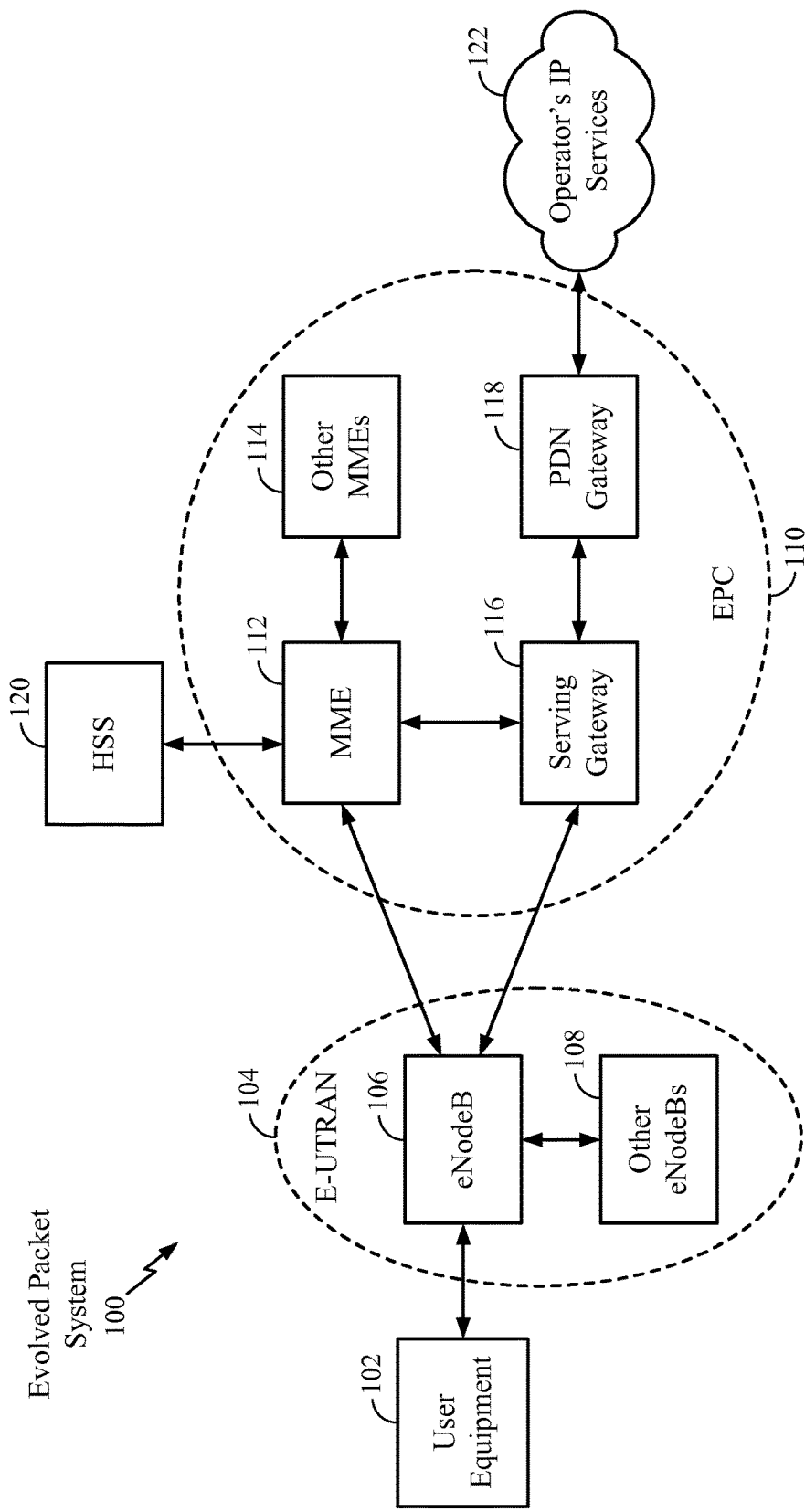
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an example LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
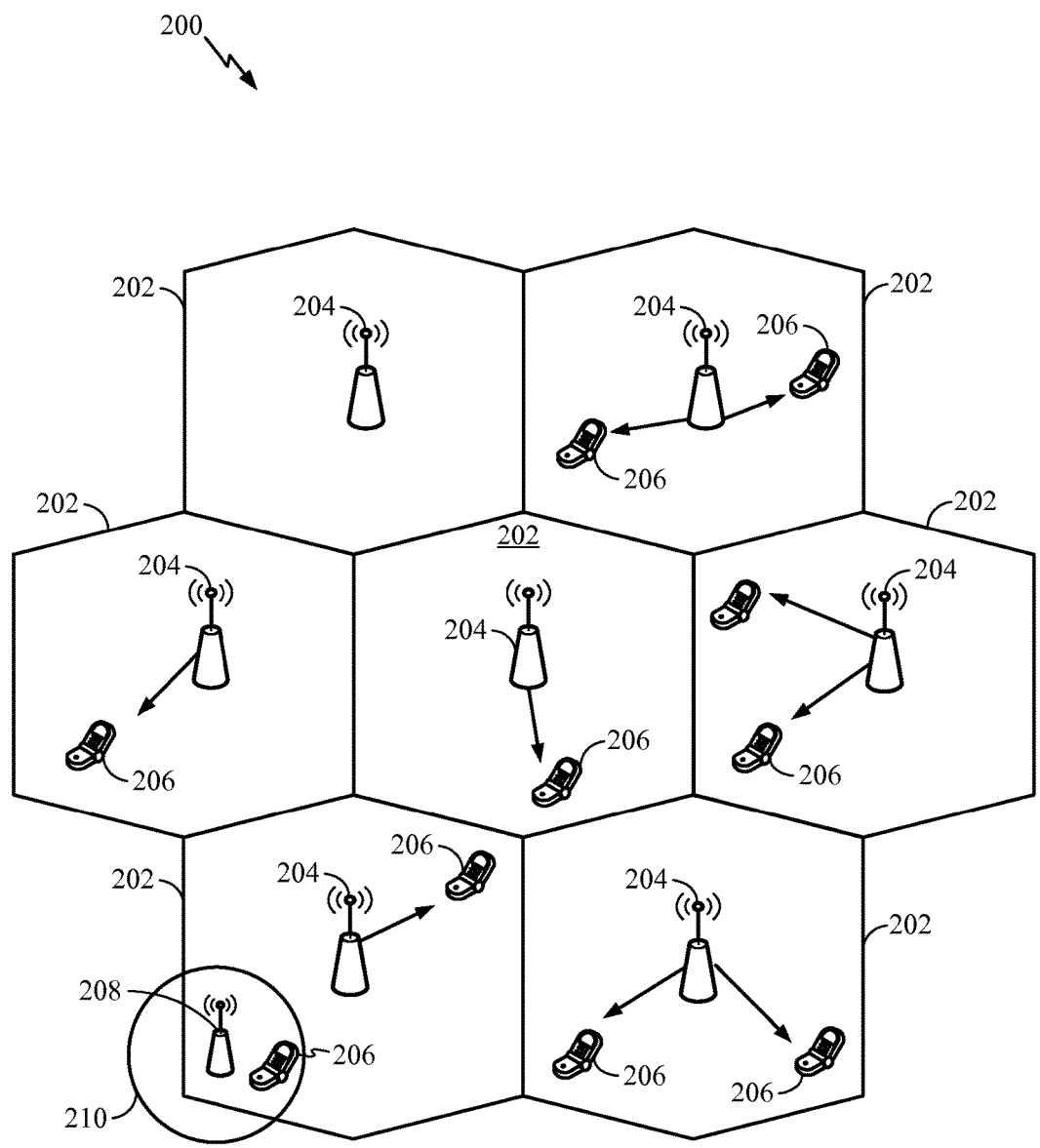
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
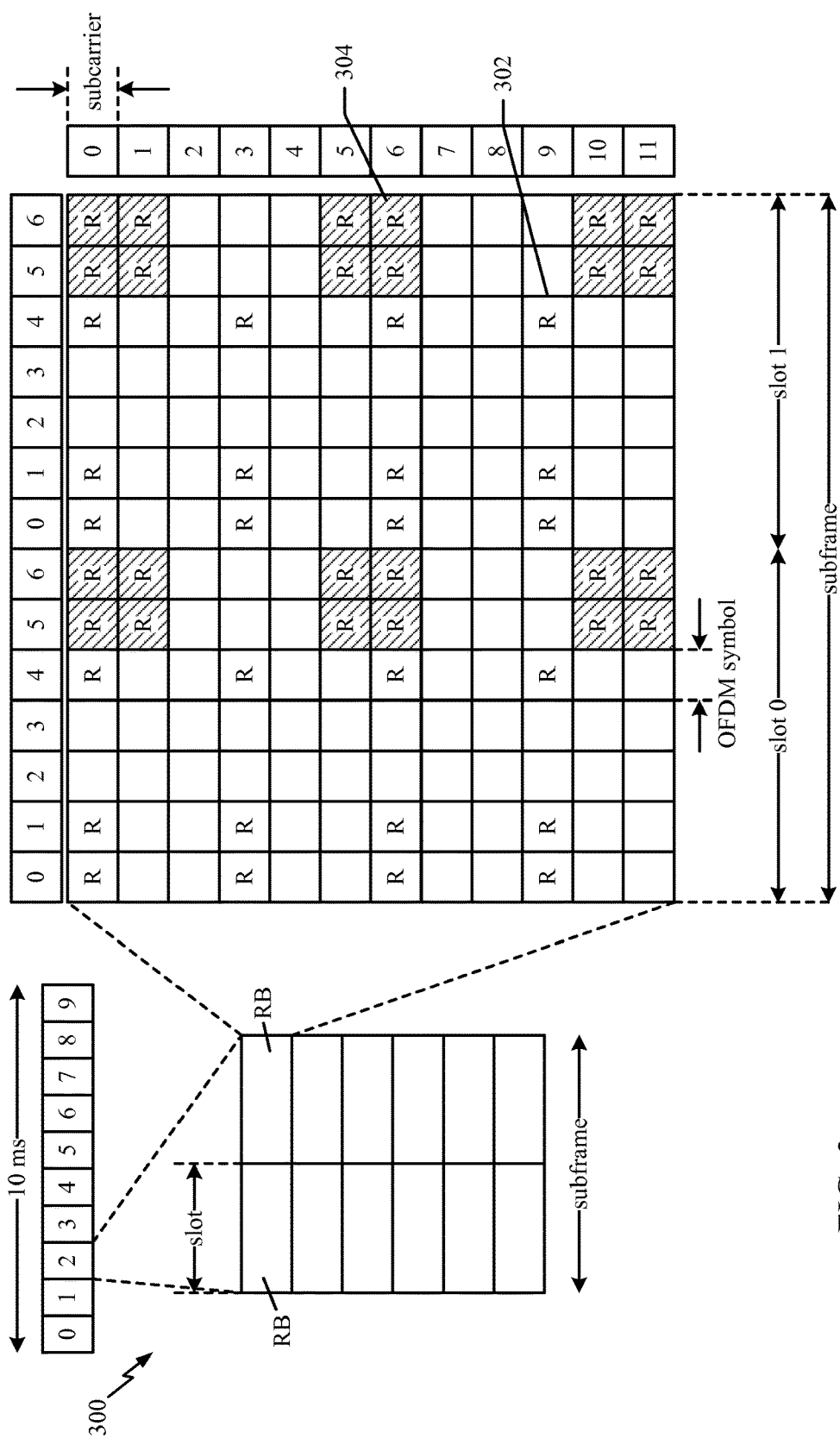
FIG. 3 is a diagram illustrating an example of a frame structure for use in an access network.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
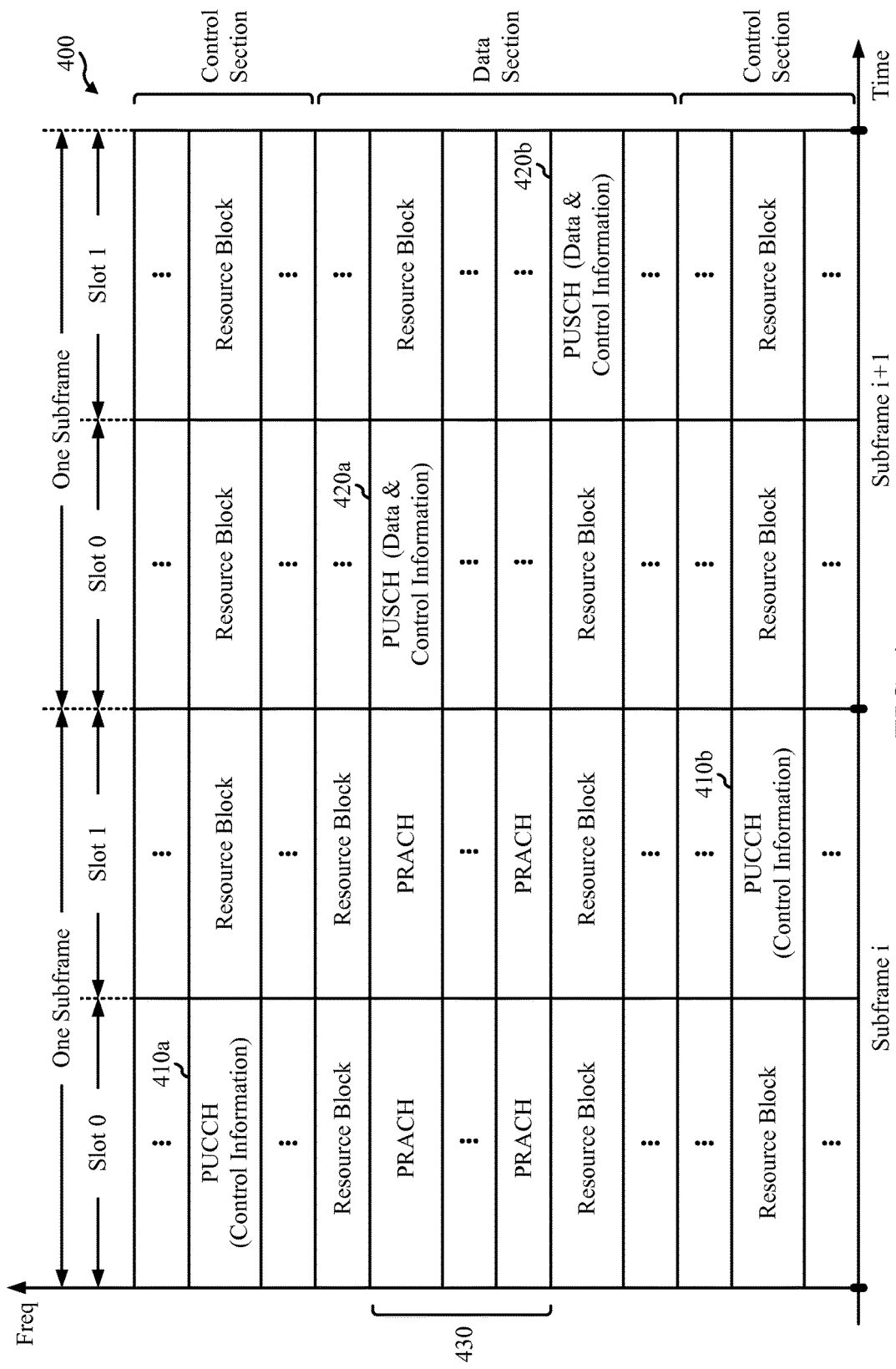
FIG. 4 shows an exemplary format for the UL in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
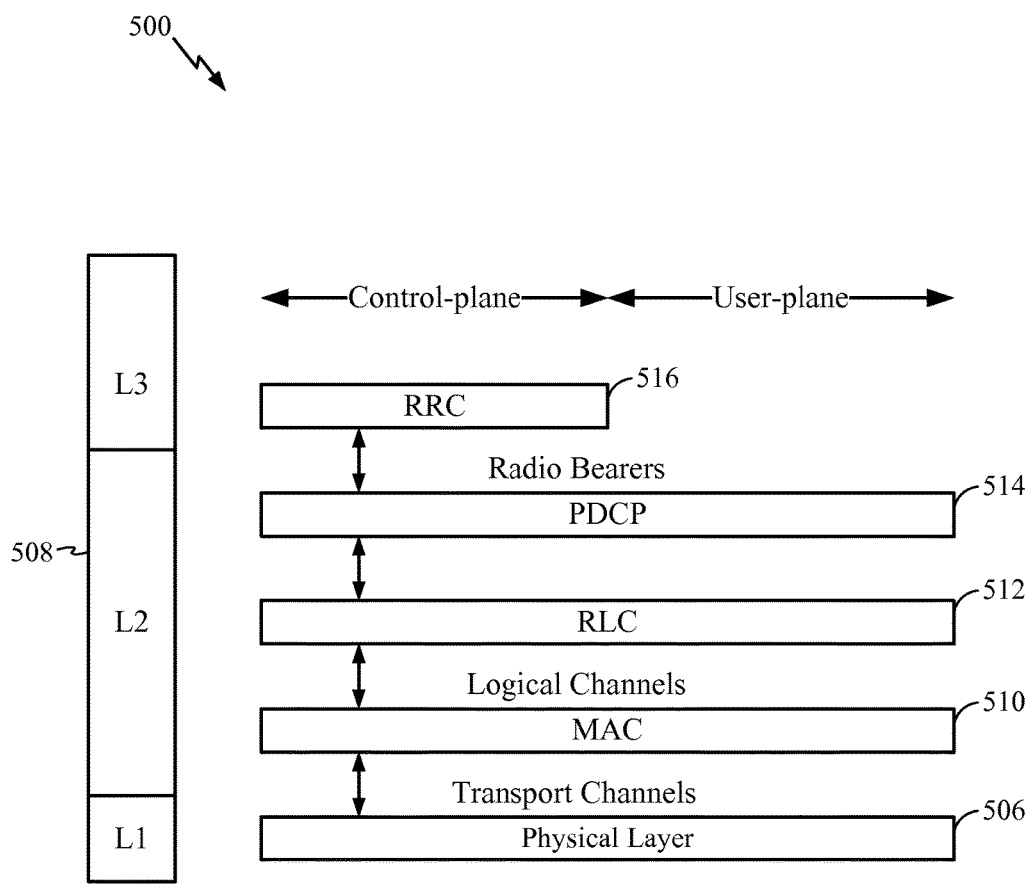
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
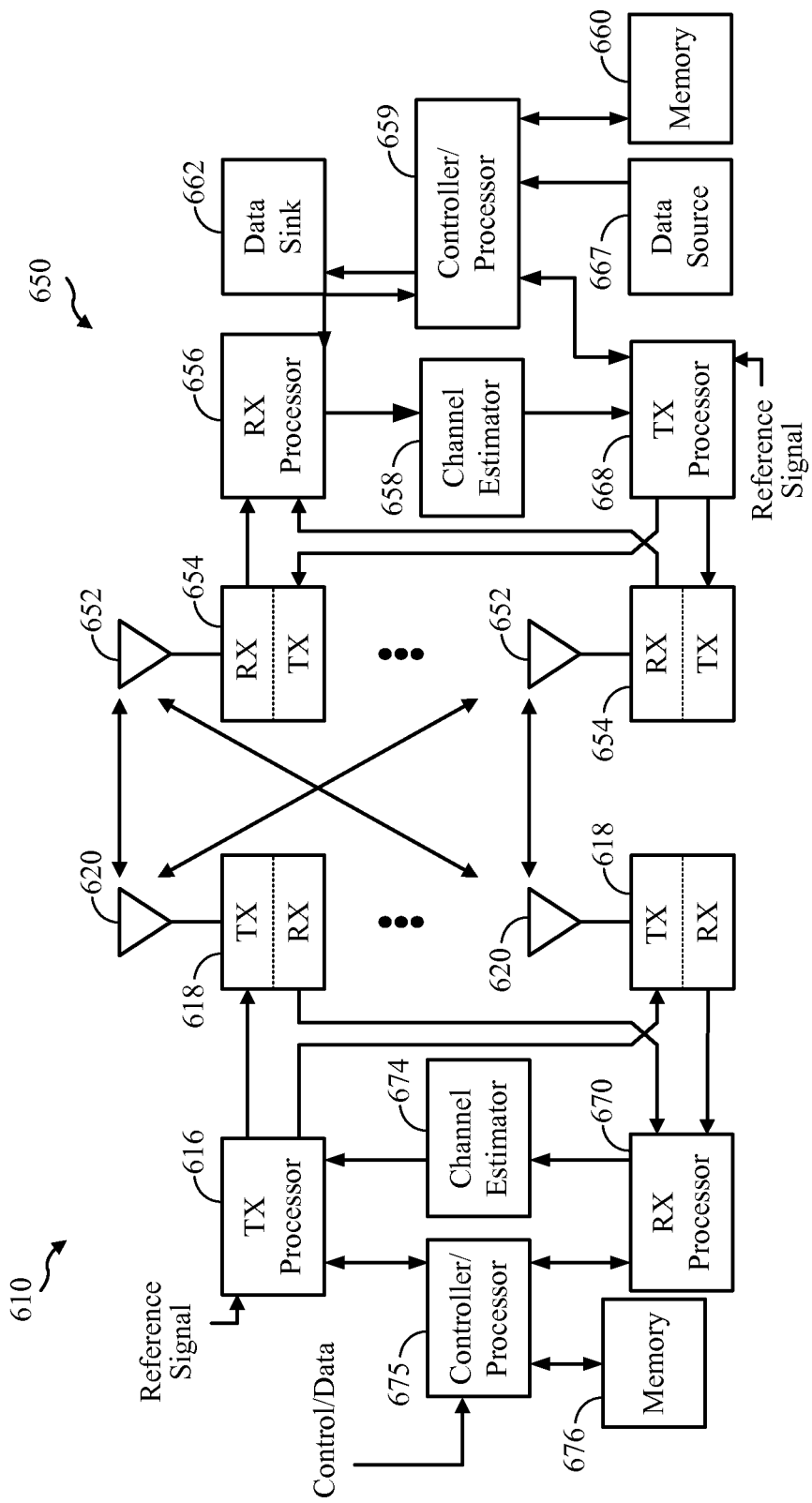
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
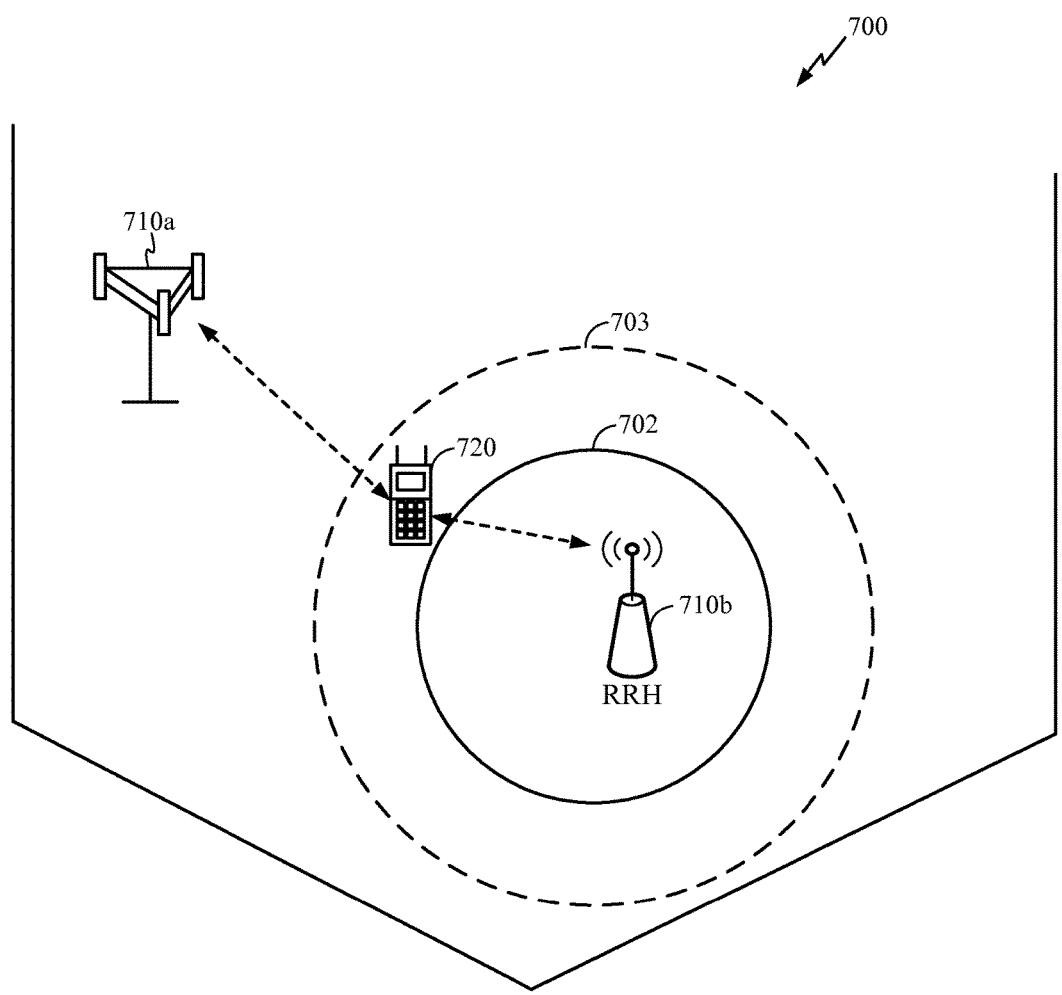
FIG. 7 is a diagram illustrating a range expanded cellular region in a heterogeneous network.

FIG. 7 is a diagram 700 illustrating a range expanded cellular region in a heterogeneous network. A lower power class eNB, such as the RRH 710b, may have a range expanded cellular region 703 that is expanded from the cellular region 702 through enhanced inter-cell interference coordination between the RRH 710b and the macro eNB 710a and through interference cancellation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Figure 8:
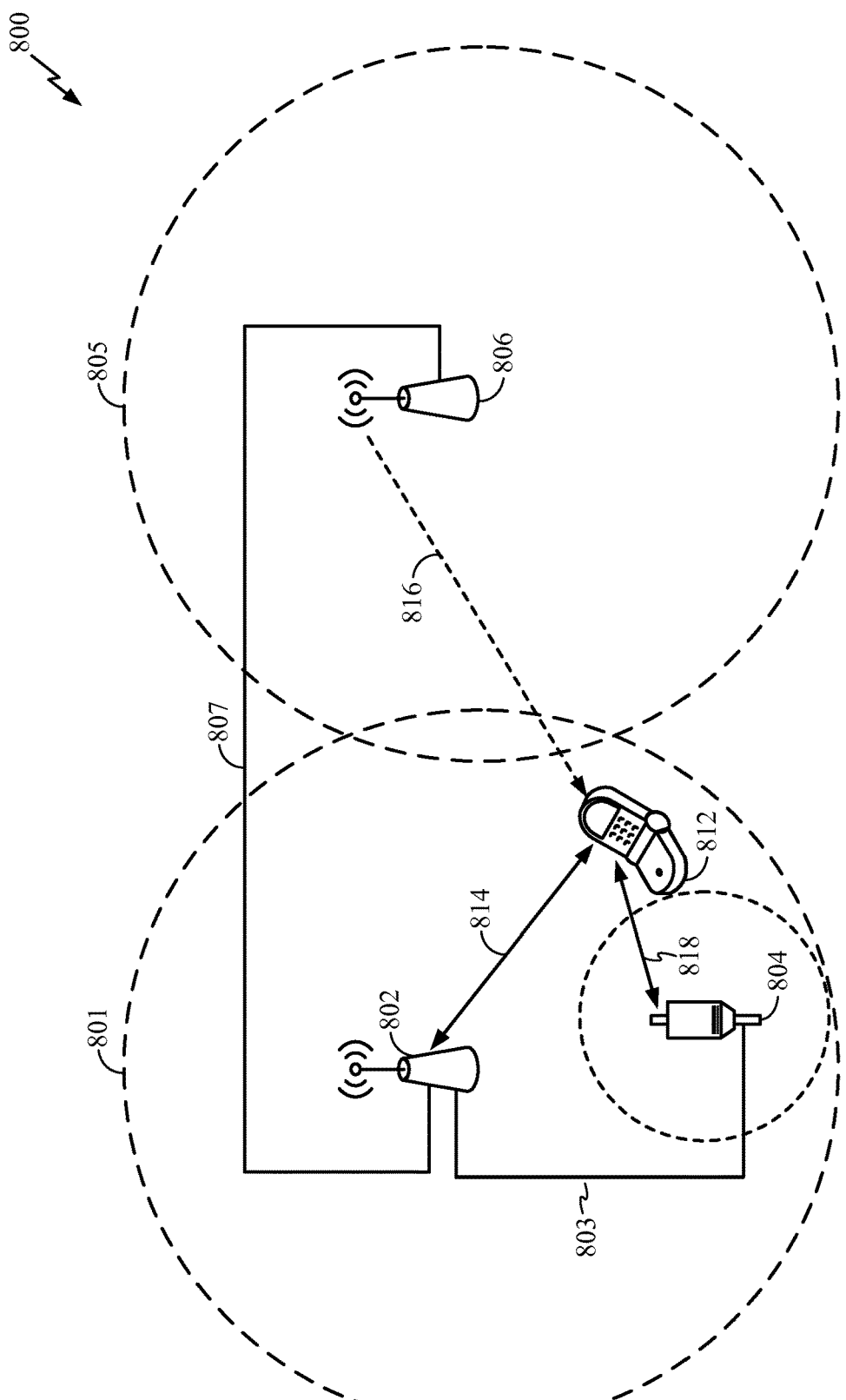
FIG. 8 is a diagram illustrating an example Macro eNB/RRH CoMP configuration in an access network.

FIG. 8 is a diagram illustrating an example Macro eNB and RRH configuration in access network 800. Access network 800 may include multiple clusters 801 of CoMP transmission points. A CoMP cluster 801 may include one or more macro eNBs 802 and one or more RRHs 804. As used herein, the CoMP cluster may be referenced to as heterogeneous where entity 804 operates with reduced transmit power, and the CoMP cluster may be referenced to as homogenous where entity 804 transmits with the same transmit power as another macro eNB. For both homogeneous and heterogeneous deployments, there may be one or more RRHs 804. In one aspect, macro eNB 802 and RRHs 804 may be connected 806 through fiber cable 803, X2 backhaul 807, etc. Generally, UE 812 may receive service from access network 800. In one aspect, a CRS pattern is common across a CoMP cluster 801, e.g., macro eNB 802 and RRHs 804 may transmit using a common CRS pattern. Further, access network 800 may include one or more other CoMP cluster 805 including one or more macro eNB/RRHs 806. In operation, CSI feedback may be obtained to assist UE 812 in communicating with macro eNB 802 and/or RRH 804 including information associated with interference 816 from another CoMP cluster 805.

In one aspect, UE 812 may be enabled to use a wireless protocol for communications with the CoMP cluster 801. Such communication protocols may include, but are not limited to, LTE release 8, LTE release 9, LTE release 10, LTE release 11, etc. To provide service to UE 812, channel estimation parameters may be obtained for a channel 814 to potentially be used between UE 812 and macro eNB 802, and/or for a channel 818 between UE 812 and RRH 804, and interference estimation parameters may be obtained to measure interference 816. In one aspect, interference 816 may potentially originate from other RRHs 804, macro eNB 802, and/or other CoMP clusters 805. Various schemes for configuring resource element patterns for various resource pattern groups (e.g., CoMP clusters) to allow a UE perform channel estimation and interference estimation are now presented.

Figure 9:
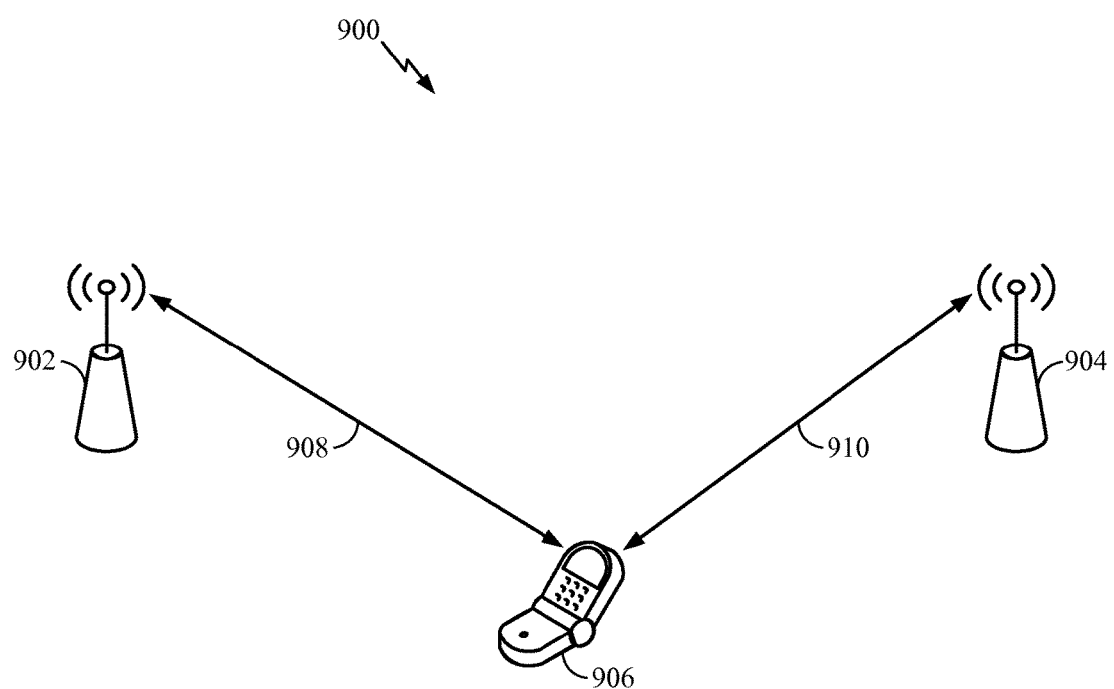
FIG. 9 is a diagram illustrating another example Macro eNB/RRH CoMP configuration in an access network.

FIG. 9 is a diagram illustrating an example access network 900 in which UE 906 may communicate with multiple possible serving transmission points (902, 904). In one aspect, transmission points (TPs 902, 904) may be coordinated to operate as a CoMP cluster. Access network 900 may include support for multiple CoMP schemes including coordinated scheduling and/or coordinated beamforming, dynamic point selection (DPS), coherent and/or non-coherent joint transmission (JT), etc. Further, access network 900 may provide support for homogeneous and/or heterogeneous CoMP cluster operations.

Interaction of SRS with Uplink Channels for Comp

According to certain aspects, UE 906 may be configured to receive, from one or more of the TPs 902/904, signaling indicating at least one of cell-specific sounding reference signal (SRS) configurations or formats for uplink channels and determining based, at least in part upon the signaling, whether at least one last symbol of a subframe is available for transmitting one or more of the uplink channels from the UE.

CoMP operations in LTE Rel-11 generally includes coordinated scheduling/coordinated beamforming (CS/CB), dynamic point selection (DPS), and joint transmission (JT) (e.g., coherent or non-coherent). CoMP operations may be supported in various deployment scenarios (i.e., homogeneous or heterogeneous scenarios). Examples of homogeneous\scenarios include CoMP operations across cells of the same macro site, and CoMP operations across neighboring macro sites. Examples of heterogeneous scenarios include CoMP operations across a macro cell and associated pico cells (e.g., remote radio heads (RRH)). The macro cell and the RRHs may be configured with different cell IDs or the same cell ID.

As described above, SRS is necessary for at least UL link adaptation, DL scheduling under channel reciprocity (especially for TDD systems), and CoMP operations. SRS configurations generally include cell-specific configurations and UE-specific configurations. Cell-specific SRS configuration generally refers to cell-specific SRS parameters such as cell-specific SRS bandwidth and SRS subframes reserved for potential SRS transmission from one or more UEs in a cell (e.g., up to every UL subframe), while the UE-specific SRS configuration generally refers to UE-specific SRS parameters such as UE-specific SRS bandwidth and subframes in which a particular UE may transmit SRS (e.g., within cell-specific SRS transmission instances). Therefore, the cell-specific SRS parameters may be broadcast as system information, and the UE-specific SRS parameters may be signaled by dedicated RRC signaling to the particular UE. The cell-specific SRS bandwidth generally covers most of the uplink system bandwidth, excluding the PUCCH region. For certain aspects, SRS hopping may be enabled by cyclically sounding the entire or a fraction of the cell-specific SRS bandwidth.

Both periodic and aperiodic SRS are supported in Rel-10. Periodic SRS, once configured, may result in an indefinite duration, at least until being deconfigured by RRC. The periodic SRS configuration may be transmitted in UE-specific periodic SRS subframes (i.e., a subset of cell-specific SRS subframes). Aperiodic SRS may be triggered by a PDCCH transmission (e.g., PDCCH for UL grants, format 0 (1-bit) and 4 (2-bit); PDCCH for DL grants, format 1A/2B/2C), and may be a one-shot duration once triggered. The aperiodic SRS configuration may be transmitted in UE-specific aperiodic SRS subframes (i.e., a subset of cell-specific SRS subframes).

To support a single carrier waveform in UL, and to be possible to transmit two or more UL channels/signals in one subframe, a shortened PUCCH format may be configured (e.g., on a per cell basis). In the second slot of a subframe, instead of utilizing all the symbols, the last symbol may not be used by PUCCH (i.e., shortened), making it possible for SRS transmissions in the last symbol of the subframe. Shortened PUCCH format may only be applicable to PUCCH formats 1/1a/1b (e.g., carrying SR/ACK/NAK), and PUCCH format 3 (e.g., carrying SR/ACK/NAK in Rel-10, and CSI in Rel-11). Shortened PUCCH may not be supported for PUCCH formats 2/2a/2b (e.g., carrying ACK/NAK and CSI).

For certain aspects, a UE may be informed whether a shortened PUCCH format is enabled or not upon receipt of a parameter (e.g., ackNackSRS-SimultaneousTransmission). If the shortened PUCCH format is not enabled, a regular PUCCH format may be used (such that PUCCH utilizes all the symbols in the second slot) and SRS may be dropped if it collides with a PUCCH transmission from the same UE. If the shortened PUCCH format is enabled, then in the cell-specific SRS subframes, the UE may transmit uplink control information such as HARQ-ACK and SR using the shortened PUCCH format. This shortened PUCCH format may be used in a cell-specific SRS subframe even if the UE does not transmit SRS in that subframe (e.g., to ensure orthogonal PUCCH among UEs using the same RB).

To support a single carrier waveform in UL, PUSCH may rate match around last symbols in some subframes. In a UE-specific aperiodic SRS subframe, PUSCH for the UE may always be rate-matched around the last symbol, even if aperiodic SRS is not transmitted. In a UE-specific periodic SRS subframe, PUSCH for the UE may be rate-matched around the last symbol if, at least, the UE also transmits a periodic SRS in the same subframe, or the UE does not transmit a periodic SRS in the same subframe, but the PUSCH has resources overlapped with the cell-specific SRS bandwidth.

For CoMP operations, virtual cell ID(s) may be introduced for PUSCH, PUCCH and/or SRS. In other words, a virtual cell ID may be associated with a cluster of cells that are involved in the CoMP operations. For certain aspects, an UL channel may be configured to be associated with one or more virtual cell IDs. The number of virtual cell IDs and/or the values of the virtual cell IDs may vary across channels. Even within a channel, the number of virtual cell IDs and the values of the virtual cell IDs may vary across different formats (e.g., for PUCCH, may vary across PUCCH formats 1/1a/1b, PUCCH formats 2/2a/2b, and PUCCH format 3)

Traditionally, the determination of whether last symbols of a subframe is used for PUCCH or PUSCH was determined, in part, based on cell-specific SRS configurations and UE-specific SRS configurations. Other factors that may be taken into consideration generally include the UL signals/channels due to transmission in a same subframe, and whether a shortened format is configured or not. With regards to UL channels/signals associated with one or more virtual cell IDs (i.e., CoMP operations), techniques are required for the UE to determine the availability of the last symbol for PUCCH or PUSCH.

Figure 10:
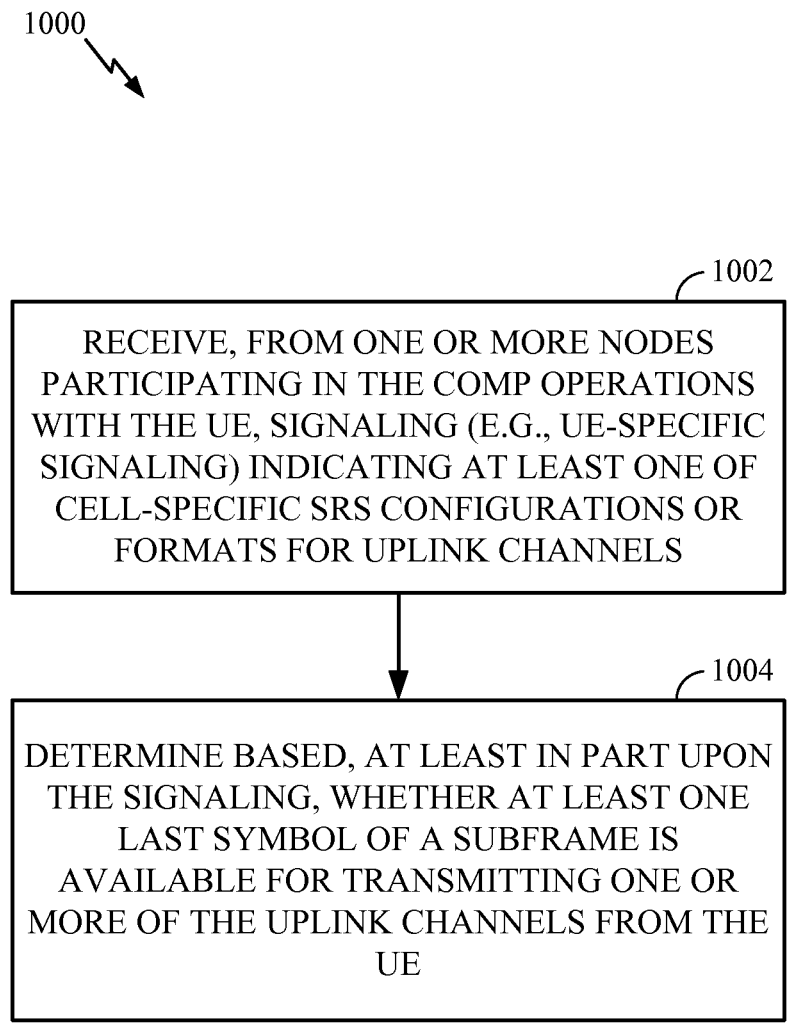
FIG. 10 illustrates example operations that may be performed, for example, by a UE, in accordance with certain aspects of the present disclosure.

FIG. 10 illustrates example operations 1000 for facilitating interaction of SRS with uplink channels, while supporting CoMP operations, in accordance with certain aspects of the present disclosure. The operations 1000 may be performed, for example, by a UE.

At 1002, the UE may receive, from one or more nodes participating in the CoMP operations with the UE, signaling (e.g., UE-specific signaling) indicating at least one of cell-specific SRS configurations or formats for uplink channels. For certain aspects, the signaling may be derived based on virtual cell identifications defined for uplink transmissions. For certain aspects, the cell-specific SRS configurations generally include a union of cell-specific SRS configurations of the nodes participating in the CoMP operations.

At 1004, the UE may determine based, at least in part upon the signaling, whether at least one last symbol of a subframe is available for transmitting one or more of the uplink channels from the UE. For certain aspects, the determining may be based further, at least in part, upon UE-specific SRS configurations or a presence of other uplink channels. For certain aspects, the signaling may indicate whether or not a shortened PUCCH format is to be used, and the UE may determine that the last symbol of the subframe is not available for transmitting the one or more of the uplink channels if the one or more of the uplink channels are shortened. Therefore, the UE may determine that the last symbol of the subframe is available for transmitting a SRS.

For certain aspects, the UE may determine whether the last symbol of the subframe is available for transmitting a PUSCH based on a first SRS configuration, and whether the last symbol of the subframe is available for transmitting a PUCCH based on a second SRS configuration.

For certain aspects, there may be at least two configurations. If the at least two configurations overlap in time, the UE may determine whether at least one last symbol of a subframe is available for transmitting one or more of the uplink channels from the UE based at least upon one of the at least two configurations chosen based on priority for use in the subframe. The one of the at least two configurations may be chosen based on at least one of a configuration with a smaller virtual cell identification, a configuration with a larger cell-specific SRS subframe periodicity, a configuration with a larger cell-specific SRS bandwidth, or an uplink channel associated with the chosen configuration.

Figure 11:
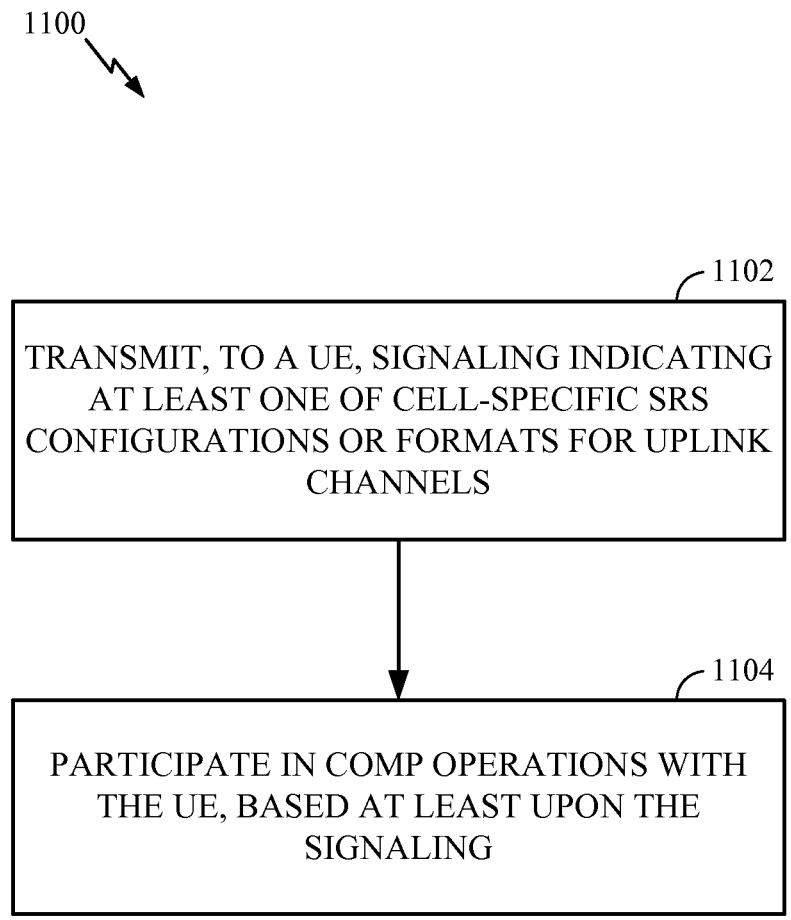
FIG. 11 illustrates example operations that may be performed, for example, by a base station, such as a node participating with other nodes in CoMP operations with a UE, in accordance with certain aspects of the present disclosure.

FIG. 11 illustrates example operations 1100 for CoMP operations, in accordance with certain aspects of the present disclosure. The operations 1100 may be performed, for example, by a node participating with other nodes in CoMP operations with a UE. At 1102, the node may transmit, to the UE, signaling indicating at least one of cell-specific SRS configurations or formats for uplink channels. At 1104, the node, based at least upon the signaling, may participate in the CoMP operations with the UE. For certain aspects, the node may arrange transmissions with the UE participating in the CoMP operations in subframes different from subframes used for transmissions with other UEs that are not participating in the CoMP operations.

For certain aspects, all cells involved in a CoMP operation for a UE or a group of UEs may use common cell-specific SRS configurations and the same value of the parameter ackNackSRS-SimultaneousTransmission. However, using common cell-specific SRS configurations may result in an unnecessary loss of the last symbol for PUSCH/PUCCH transmissions for many UEs (including non-CoMP UEs). In other words, there may be a loss of UL resources for PUSCH/PUSCH transmissions.

For certain aspects, regardless of how the virtual cell IDs are configured for UL channel/signals, a UE may utilize a single set of cell-specific SRS configurations and/or a single parameter of ackNackSRS-SimultaneousTransmission. The single set of cell-specific SRS configurations may be implicitly signaled or explicitly signaled (e.g., UE-specific signaling). For example, the single set may be implicitly derived based on one virtual cell ID defined for PUSCH/PUCCH/SRS, or implicitly derived based on the PDCCH cell if a legacy PDCCH is available.

Similarly, the single parameter of ackNackSRS-SimultaneousTransmission may be implicitly or explicitly indicated to the UE (e.g., in a UE specific manner). The UE may still be configured with one or more sets of UE-specific SRS configurations. Utilizing the single set cell-specific SRS configurations and/or the single parameter ackNackSRS-SimultaneousTransmission, the UE may determine the availability of the last symbol for PUCCH/PUSCH. Other parameters, such as UE-specific SRS configurations and the presence/absence of other UL channels/signals may be considered.

Because multiple cells may be involved in CoMP operations with a UE, the UE may use the same cell-specific SRS configurations and/or configuration of ackNackSRS-SimultaneousTransmission, which may result in an unnecessary loss of the last symbol for PUSCH/PUCCH for many UEs (including non-CoMP UEs).

Even if the cells involved in the CoMP operations do not have the same configuration, the CoMP UE may be indicated a single set of cell-specific SRS configuration and/or the parameter ackNackSRS-SimultaneousTransmission, for example, by a union or intersection of the sets of the cell-specific SRS configurations for each cell. Moreover, the eNB may be required to ensure orthogonality of PUCCH among UEs since different UEs (e.g., CoMP vs. non-CoMP UEs) may have a different understanding of whether a subframe is a cell-specific SRS subframe and/or whether shortened PUCCH format is configured or not. As a result, one UE may use a regular PUCCH format and another UE may use shortened PUCCH format in the same subframe. However, orthogonality may still be achieved by arranging UEs of different understandings (e.g., CoMP vs. non-CoMP UEs) in different subframes and/or RBs.

For certain aspects, a UE may utilize multiple sets of cell-specific SRS configurations and/or multiple parameters ackNackSRS-SimultaneousTransmission. This situation may be preferable if two or more virtual cell IDs are configured for UL channel/signals (regardless of whether for the same or different UL channels signals). The two or more sets of cell-specific SRS configurations may be for all UL channels, for some UL channels, or may be split among UL channels (e.g., one set for PUSCH and another set for PUCCH). In order to determine the availability of the last symbol for PUCCH or PUSCH, the decision may be made on a per subframe basis based on the set of cell-specific configuration(s) in use.

If the two or more sets of cell-specific SRS configurations do not overlap in time, the determination of the availability of the last symbol for PUCCH/PUSCH in a subframe may be based in part on the set of cell-specific SRS configurations corresponding to the subframe, and/or the corresponding parameter ackNackSRS-SimultaneousTransmission. The linkage of an ackNackSRS-SimultaneousTransmission parameter to a cell-specific SRS configuration may be implicitly or explicitly indicated.

However, two or more sets of cell-specific SRS configurations may overlap in time. For example, two or more sets of cell-specific SRS configurations may reserve SRS subframes for potential SRS transmission in the same subframes (e.g., subframe 2 of every frame). For certain aspects, some rules may be followed on how to handle the subframes with overlapped cell-specific configurations. For example, the overlap may be considered as a misconfiguration, where the UE behavior may not be specified. However, the eNB may ensure the configurations do not overlap. As another example, the UE may choose one set based on some priority for use in the subframe. For example, the UE may choose the configuration with smallest virtual cell ID, the one with largest cell-specific SRS subframe periodicity, the one with largest cell-specific SRS bandwidth, or whether the set is for a PUCCH or PUSCH transmission. As another example, the UE may choose two or more sets for use in the subframe. For example, if one set is defined for PUCCH and another set is defined for PUSCH, the decision may be made separately for PUCCH and PUSCH.

When uplink control information (UCI) is piggybacked on a PUSCH transmission, the virtual cell ID used for the PUSCH transmission may be used for the UCI piggybacked on PUSCH as well, even if a different virtual cell ID is configured for UCI transmission on PUCCH.

It will be appreciated that, in accordance with one or more aspects described herein, inferences can be made regarding selecting SRS configuration parameters, evaluating cell information, issuing power control commands, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for wireless communications by a user equipment (UE), comprising:
   receiving, from one or more nodes participating in coordinated multipoint (CoMP) operations with the UE, signaling comprising an indication of cell-specific sounding reference signal (SRS) configurations, wherein the cell-specific SRS configurations comprise a common cell-specific SRS configuration for nodes participating in the CoMP operations; and
   determining, based at least in part upon the signaling, whether a last symbol of a subframe is available for transmitting one or more uplink channels from the UE, wherein the determining is further based on UE-specific SRS configurations, wherein:
      the cell-specific SRS configurations comprise at least two cell-specific SRS configurations; and
      if the at least two cell-specific SRS configurations overlap in time, the determining is based at least upon one of the at least two cell-specific SRS configurations chosen based on a priority for use in the subframe.

2. The method of claim 1, wherein the signaling further indicates whether or not a shortened physical uplink control channel (PUCCH) format is to be used.

3. The method of claim 2, wherein the determining comprises:
   determining the last symbol of the subframe is not available for transmitting the one or more uplink channels if the one or more of the uplink channels are shortened.

4. The method of claim 3, further comprising determining the last symbol of the subframe is available for transmitting a SRS.

5. The method of claim 1, wherein the signaling comprises UE-specific signaling.

6. The method of claim 1, wherein the indication is derived based on virtual cell identifications defined for uplink transmissions.

7. The method of claim 1, wherein the cell-specific SRS configurations comprise a union of cell-specific SRS configurations of the nodes participating in the CoMP operations.

8. The method of claim 1, wherein the determining comprises:
   determining whether the last symbol of the subframe is available for transmitting a physical uplink shared channel (PUSCH) based on a first SRS configuration; and
   determining whether the last symbol of the subframe is available for transmitting a physical uplink control channel (PUCCH) based on a second SRS configuration.

9. The method of claim 1, wherein the chosen SRS configuration is chosen based on: having a smallest virtual cell identification of the at least two SRS configurations, having a larger cell-specific SRS subframe periodicity of the at least two SRS configurations, having a larger cell-specific SRS bandwidth of the at least two SRS configurations, or an uplink channel associated with the chosen configuration.

10. The method of claim 1, wherein:
    the signaling further comprises an indication of formats for uplink channels; and
    the determining is further based on a presence of other uplink channels.

11. An apparatus for wireless communications by a user equipment (UE), comprising:
    means for receiving, from one or more nodes participating in coordinated multipoint (CoMP) operations with the UE, signaling comprising an indication of cell-specific sounding reference signal (SRS) configurations, wherein the cell-specific SRS configurations comprise a common cell-specific SRS configuration for nodes participating in the CoMP operations; and
    means for determining, based at least in part upon the signaling, whether a last symbol of a subframe is available for transmitting one or more uplink channels from the UE, wherein the means for determining is configured to determine whether the last symbol of the subframe is available for transmitting the one or more uplink channels from the UE based further on UE-specific SRS configurations, wherein:
        the SRS configurations comprise at least two SRS configurations; and
        if the at least two SRS configurations overlap in time, the means for determining are configured to determine based at least upon one of the at least two SRS configurations chosen based on a priority for use in the subframe.

12. The apparatus of claim 11, wherein the signaling further indicates whether or not a shortened physical uplink control channel (PUCCH) format is to be used.

13. The apparatus of claim 12, wherein the means for determining comprises:
    means for determining the last symbol of the subframe is not available for transmitting the one or more uplink channels if the one or more of the uplink channels are shortened.

14. The apparatus of claim 13, further comprising means for determining the last symbol of the subframe is available for transmitting a SRS.

15. The apparatus of claim 11, wherein the signaling comprises UE-specific signaling.

16. The apparatus of claim 11, wherein the indication is derived based on virtual cell identifications defined for uplink transmissions.

17. The apparatus of claim 11, wherein the cell-specific SRS configurations comprise a union of cell-specific SRS configurations of the nodes participating in the CoMP operations.

18. The apparatus of claim 11, wherein the means for determining comprises:
means for determining whether the last symbol of the subframe is available for transmitting a physical uplink shared channel (PUSCH) based on a first SRS configuration; and
means for determining whether the last symbol of the subframe is available for transmitting a physical uplink control channel (PUCCH) based on a second SRS configuration.

19. The apparatus of claim 11, wherein the chosen SRS configuration is chosen based on: having a smallest virtual cell identification of the at least two SRS configurations, having a larger cell-specific sounding reference signal (SRS) subframe periodicity of the at least two SRS configurations, having a larger cell-specific SRS bandwidth of the at least two SRS configurations, or an uplink channel associated with the chosen configuration.

20. The apparatus of claim 11, wherein:
the signaling further comprises an indication of formats for uplink channels; and
the determining is further based on a presence of other uplink channels.

21. An apparatus for wireless communications by a user equipment (UE), comprising:
at least one processor configured to:
receive, from one or more nodes participating in coordinated multipoint (CoMP) operations with the UE, signaling comprising an indication of cell-specific sounding reference signal (SRS) configurations, wherein the cell-specific SRS configurations comprise a common cell-specific SRS configuration for nodes participating in the CoMP operations; and
determine, based at least in part upon the signaling, whether a last symbol of a subframe is available for transmitting one or more uplink channels from the UE, wherein the determining is further based on UE-specific SRS configurations, wherein:
the cell-specific SRS configurations comprise at least two cell-specific SRS configurations; and
if the at least two cell-specific SRS configurations overlap in time, the at least one processor is configured to determine based at least upon one of the at least two cell-specific SRS configurations chosen based on a priority for use in the subframe; and
a memory coupled to the at least one processor.

22. A non-transitory computer-readable medium for wireless communications by a user equipment (UE), the non-transitory computer-readable medium having code for:
receiving, from one or more nodes participating in coordinated multipoint (CoMP) operations with the UE, signaling comprising an indication of cell-specific sounding reference signal (SRS) configurations, wherein the cell-specific SRS configurations comprise a common cell-specific SRS configuration for nodes participating in the CoMP operations; and
determining, based at least in part upon the signaling, whether a last symbol of a subframe is available for transmitting one or more uplink channels from the UE, wherein the determining is further based on UE-specific SRS configurations, wherein:
the cell-specific SRS configurations comprise at least two cell-specific SRS configurations; and
if the at least two cell-specific SRS configurations overlap in time, the determining is based at least upon one of the at least two cell-specific SRS configurations chosen based on a priority for use in the subframe.

* * * * *